R. E. HELLMUND.
SYSTEM OF CONTROL.
APPLICATION FILED AUG. 7, 1917.

1,328,515.

Patented Jan. 20, 1920.
5 SHEETS—SHEET 2.

INVENTOR
Rudolf E. Hellmund
BY
Wesley G. Carr
ATTORNEY

WITNESSES:
J. T. Wurmb.
W. R. Coley

R. E. HELLMUND.
SYSTEM OF CONTROL.
APPLICATION FILED AUG. 7, 1917.

1,328,515.

Patented Jan. 20, 1920.
5 SHEETS—SHEET 5.

WITNESSES:

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,328,515. Specification of Letters Patent. Patented Jan. 20, 1920.

Application filed August 7, 1917. Serial No. 184,797.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Systems of Control, of which the following is a specification.

My invention relates to systems of control and especially to the automatic control of electric railway motors and the like.

One object of my invention is to provide a relatively simple and reliable system of the above-indicated character which shall embody means for effecting automatic speed control during both acceleration and regeneration, with manual adjustment of the desired average rate of speed, in combination with other automatic means in the form of relay devices, for example, for preventing certain abnormal machine conditions, such as an excess current or an unduly high ratio of armature ampere-turns to field-winding ampere turns.

More specifically stated, it is an object of the present invention to provide a system of the type shown in my co-pending application, Serial No. 171,166, filed May 26, 1917, which shall be quicker-acting in certain of the regulating functions.

My invention may best be understood by reference to the accompanying drawings, wherein.

Figure 1:
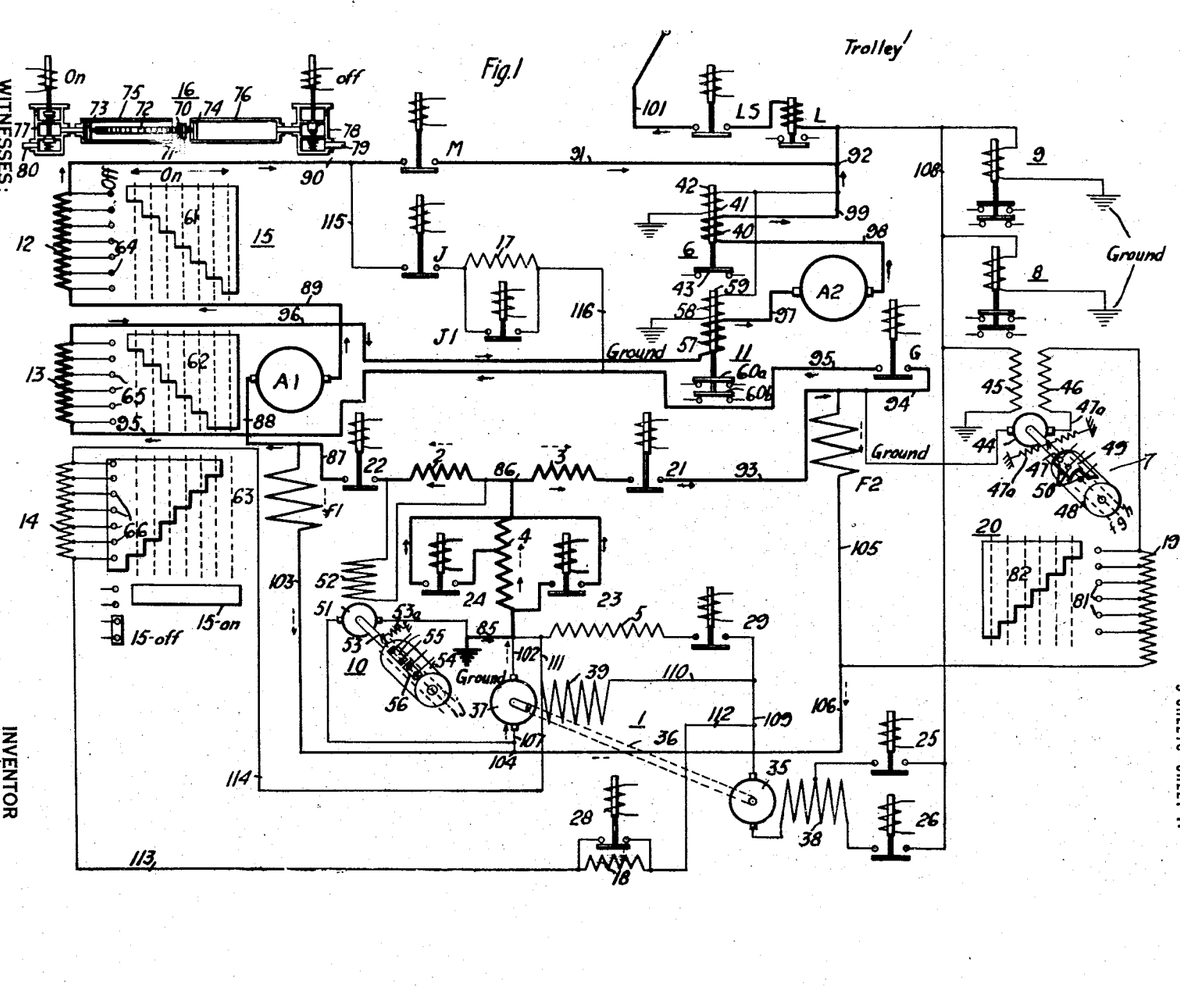
Figure 1 is a diagrammatic view of the main circuits of a system of control embodying the invention.

Referring to Fig. 1 of the drawings, the system shown comprises supply-circuit conductors Trolley and Ground; a plurality of main dynamo-electric machines respectively having commutator-type armatures A1 and A2 and field windings F1 and F2 of the series type; a motor-generator set 1, or the like, that is fed from the supply circuit for the purpose of energizing the main field windings; a plurality of main-circuit resistors 2, 3, 4, 12, 13 and 17 that are associated with the main machines in a manner to be described; a plurality of auxiliary circuit resistors 5, 14, 18 and 19; a plurality of relay devices 6 to 11, inclusive, which may be respectively termed a regenerative overload relay, a speed relay, a line-voltage relay, an over-voltage relay, an ampere-turn ratio-limiting relay and an accelerating overload relay; a plurality of switches LS, J, J1, M, G, and 21 to 29, inclusive; a drum control apparatus 15 having an actuating mechanism 16 for suitably varying the active circuit value of the resistors 12, 13 and 14; an auxiliary or speed-regulating controller 20 for varying the active value of the resistor 19; and a low-current relay device L.

The motor-generator set 1 is shown as comprising a driving or motor armature 35 which is mechanically coupled, through a shaft 36, with an exciting or generator armature 37. A plural-section field winding 38, which is governed by switches 25 and 26, is connected in series relation with the auxiliary driving armature 35, while an exciting field winding 39 that is energized in accordance with the load current of the motor-generator set is provided for the exciting armature 37.

The common main-circuit resistor 4 is adapted to be partially short-circuited by the switch 24 and wholly excluded from circuit by the switch 23, for purposes to be set forth.

The transition resistor 17 is short-circuited upon the closure of switch J1, and switch 28 serves a similar purpose with respect to resistor 18. Variable resistors 14 and 18 are connected in series relation across the exciting field winding 39 for the auxiliary generating armature 37, while another shunt circuit, including resistor 5 and switch 29, may also be closed.

The regenerative overload relay 6 is of the solenoid type, embodying two differentially-related actuating coils 40 and 41 which are respectively energized in accordance with the current traversing the main armature A2 and with the supply-circuit voltage. The actuating coils energize a common core member 42, to which is attached the familiar bridging contact member 43. The arrangement of parts is such that the actuating coils 40 and 41 assist each other to lift the relay to its upper or open-circuit position upon the occurrence of a regenerative overload condition, the relay, however, remaining inert under accelerating conditions by reason of the differential relation of the actuating coils.

The speed relay 7 is of the torque-motor type and comprises a commutator-type armature 44 and a plurality of differentially-related exciting field windings 45 and 46 which are respectively energized by the supply-circuit voltage and by the current traversing the relay armature 44. The shaft 47 of the relay carries a small cylinder or drum 48 upon which is mounted a contact segment 49 for the purpose of engaging various combinations of control fingers 50 to govern certain auxiliary-circuit connections to be set forth, in accordance with positions $f$, $g$ and $h$ of the relay device, which normally occupies the illustrated intermediate position $g$ by reason of the action of suitable centering spring 47a. The relay armature 44 is connected, through exciting field winding 46 and variable resistor 19, across the main field winding F2.

By differentially disposing the exciting field windings 45 and 46, therefore, the speed relay 7 may be caused to oscillate from the one to the other of its three positions, in accordance with the relative values of supply-circuit voltage and main-field-winding voltage. In other words, since the field strength of the main machine serves as an indication of the speed thereof, by thus balancing the main-field-winding voltage against the supply-circuit voltage in the illustrated manner, the speed relay 7 may be utilized to govern certain auxiliary-circuit connections to vary the excitation supplied to the main field windings from the auxiliary armature 37 and thus maintain a substantially constant machine speed during either acceleration or regeneration. The hand-controller 20 may be adjusted to short-circuit any desired portion of the variable resistor 19, whereby the average speed which it is desired that the main machines shall take may be readily predetermined.

The line-voltage relay 8 and the over-voltage relay 9 are respectively provided with an actuating coil that is energized from the supply circuit and each comprises a plurality of movable or bridging contact members for governing certain auxiliary-circuit connections to be subsequently traced in detail. The line-voltage relay 8 is adapted to move to its upper position under normal supply-circuit-voltage conditions, when the line switch LS is closed, while the over-voltage relay 9 is moved to its upper or circuit-opening position only under excess-voltage conditions, such as may be caused in the illustrated system by the sudden failure of supply-circuit voltage.

The ampere-turn ratio-limiting relay 10 is of the torque-motor type and comprises a commutator-type armature 51, which is connected across the auxiliary generating armature 37, and an exciting field winding 52, which is connected across the stabilizing resistor 2. The operating shaft 53 of the relay carries a small drum or cylinder 54 upon which are mounted a plurality of contact segments 55 and 56 for governing certain auxiliary circuit connections in positions $i$ and $j$ of the relay, which is biased to the illustrated position $i$ through the agency of a suitable spring 53a.

The relay 10 is adapted to move to its position $j$ under conditions of an excessive or undesirable ratio of armature ampere-turns to main-field-winding ampere-turns during acceleration of the main motors, whereby "flash-over" difficulties, and the like, may be automatically prevented. The relay is operative during acceleration only, by reason of the fact that main-armature current traverses the stabilizing resistor 2 in opposite directions during the accelerating and the regenerating periods and, consequently, the desired direction of movement of the relay armature 51 can occur only during the accelerating period, by reason of the design and arrangement of relay parts.

The accelerating overload relay 11 is similar in construction to the relay 6 comprising one actuating coil 57, which is connected in series relation with the main armature A2, and a second actuating coil 58, which is connected across the supply-circuit conductors. A common core member 59 is provided with a plurality of bridging contact members 60a and 60b for opening certain auxiliary-circuit connections whenever a predetermined overload current traverses the main armature A2 during acceleration. The actuating coils 57 and 58 assist each other under accelerating conditions, but act differentially during regeneration, whereby the relay 11 becomes operative only under the former conditions.

The control apparatus 15 comprises a plurality of contact segments 61, 62 and 63 which are suitably configured to vary the main-circuit resistors 12 and 13 and the auxiliary-circuit resistor 14 to effect the desired circuit relations. The contact segments 61 and 62 are adapted to gradually short-circuit the accelerating resistors 12 and 13 as the controller is moved in a forward direction, while the contact segment 63 is adapted to gradually increase the active circuit value of the resistor 14 under such conditions to thereby gradually increase the voltage of the exciting field winding 39 and thus indirectly increase the main field-winding voltage during regeneration to compensate for any speed variations of the main machines.

The actuating mechanism 16 is of a familiar electrically-controlled, pneumatically-actuated type, comprising a pinion 70 which is secured to one end of the controller-operating shaft 71 to mesh with a horizontally-movable rack member 72, the opposite ends of which constitute pistons 73 and 74 that travel within appropriate operating cylinders 75 and 76. A normally closed valve 77, having an actuating coil "On", is associated with the outer end of the cylinder 75, while a normally open valve 78, having an actuating coil "Off", initially effects communication between a supply pipe 79 and the operating cylinder 76 to bias the apparatus to the illustrated position. A similar supply pipe 80 is provided for the normally closed valve 77, and fluid pressure from any suitable source (not shown) may be conveyed to the pipes 79 and 80.

The mechanical operation of the actuating device just described may be set forth as follows: upon concurrent energization of the actuating coils "On" and "Off", the initial unbalanced fluid-pressure conditions are reversed, that is, fluid pressure is admitted through the valve 77 to the operating cylinder 75 and is exhausted from the other cylinder 76, through the valve 78, to the atmosphere. Consequently, movement of the illustrated pistons toward the right ensues. To arrest such movement, at any time, it is merely necessary to deënergize the "off" coil, whereupon, balanced high-pressure conditions obtain in the actuating device and a positive and reliable stoppage thereof is effected. To produce a return movement of the mechanism, the actuating coils "On" and "Off" are concurrently deënergized, whereupon, fluid-pressure conditions revert to the original state, and the desired backward movement is effected.

Assuming that regenerative operation, for example, has been inaugurated in any suitable manner, the main circuits of the illustrated system, indicated by the solid arrows, may be traced as follows: from the supply conductor Ground through conductor 85, the common main-circuit resistor 4, which may be partially or wholly short-circuited by the switches 24 and 23, respectively, to a junction-point 86, where the circuit divides, one branch including stabilizing resistor 2, switch 22, conductors 87 and 88, main armature A1, conductor 89, variable resistor 12, conductor 90, switch M and conductor 91 to a second junction-point 92, and another branch traversing stabilizing resistor 3, switch 21, conductors 93 and 94, switch G, conductor 95, variable resistor 13, conductor 96, actuating coil 57 of the accelerating overload relay 11, conductor 97, main armature A2, conductor 98, actuating coil 40 of the regenerative overload relay 6 and conductor 99 to the junction-point 92, whence a common circuit is completed through the actuating coil of the low-current relay device L, switch LS, and conductor 101 to the trolley.

The exciting or main-field-winding circuit, indicated by the dotted arrows, is established from the positive terminal of the auxiliary generator armature 37, through conductor 102 and resistor 4 to the junction-point 86, where the circuit divides, one branch traversing stabilizing resistor 2, switch 22, conductor 87, main field winding F1 and conductor 103 to another junction-point 104, and the other branch including stabilizing resistor 3, switch 21, conductor 93, main field winding F2 and conductors 105 and 106 to the junction-point 104, whence circuit is completed through conductor 107 to the negative terminal of the auxiliary armature 37.

An auxiliary circuit is established from the conductor 92 through conductor 108, switch 25 or switch 26 and a portion or the whole of the exciting field winding 38, as the case may be, auxiliary driving armature 35, conductors 109 and 110, exciting field winding 39 for the auxiliary generating armature 37 and conductors 111 and 85 to ground. As previously stated, the exciting field winding 39 may be shunted by a circuit including resistor 5 and switch 29, or by a second variable-resistance circuit including conductors 112, resistor 18 or switch 28, conductor 113, resistor 14 and conductor 114.

If conditions are suitable for series connection of the main armatures during either the accelerating or the regenerative period, parallel-connecting switches M and G are opened, while series-connecting switch J is closed. Under such circumstances, the main-armature circuit is established from ground through the main armature A1 and resistor 12 to the conductor 90, as previously traced, whence circuit is continued through conductor 115, switch J, transition resistor 17, or switch J1, and conductor 116 to the conductor 95, whence circuit is completed through resistor 13 and main armature A2, as already traced. The main-field-winding connections are unchanged during such series connection of the main armatures.

Figure 2:
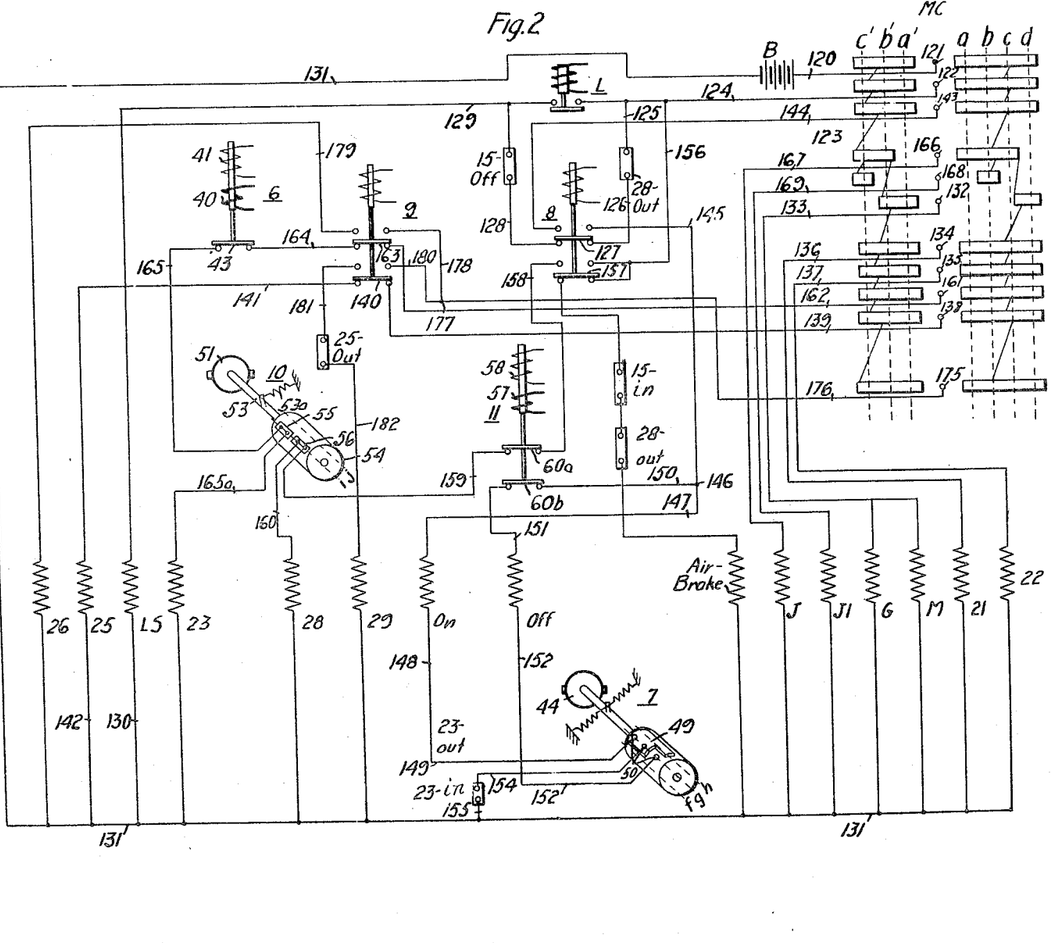
Fig. 2 is a diagrammatic view of an auxiliary governing system for effecting the desired connections in the main system of Fig. 1.
Figure 3:
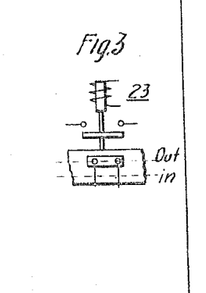
Fig. 3 is a detailed diagrammatic view of a complete switch that is employed in the system shown in Fig. 1.

Reference may now be had to Fig. 2, wherein the auxiliary governing system shown comprises various actuating coils and auxiliary contact members of the switching devices and apparatus that are shown in Fig. 1, together with a master controller MC that is adapted to occupy suitable accelerating and regenerative positions on opposite sides of an "off" or neutral position, for the purpose of conveying exciting energy from a suitable source, such as a battery B, to the various actuating coils. Certain of the illustrated circuits include interlocking contact members of the familiar type that is fully illustrated in Fig. 3, and no further description thereof is deemed necessary.

Assuming, by way of illustration, that the master controller MC is actuated to its initial regenerative position $a'$, one circuit is established from the positive terminal of the battery B through conductor 120, control fingers 121 and 122, which are bridged by contact segment 123 of the master controller, conductors 124 and 125, interlock 28—out, conductor 126, bridging contact member 127 of the line-voltage relay 8, in its temporary lower position, conductor 128, interlock 15—off of the main control drum 15, conductor 129, actuating coil of the line switch LS and conductors 130 and 131 to the negative battery terminal.

A second circuit is simultaneously established from the contact segment 123 through control finger 132, conductor 133 and the parallel-related actuating coils of the switches M and G to the negative battery conductor 131.

Further circuits are also established, at this time, from the contact segment 123, through control fingers 134 and 135 and conductors 136 and 137, respectively, to the actuating coils of the switches 21 and 22.

Still another circuit is continued from the contact segment 123 through control finger 138, conductor 139, bridging contact member 140 of the over-voltage relay 9 in its normal or lower position, conductor 141, the actuating coil of the switch 25 and conductor 142 to the negative conductor 131.

As soon as the switches LS, M and G have closed, current traverses the main machines and also the actuating coil of the low-current relay device L, whereby the relay is raised to its circuit-closing position to directly connect conductors 124 and 129, thus maintaining the closure of the line switch LS, irrespective of the movement of the line-voltage relay 8 to its upper position to interrupt the initially traced energizing circuit for the actuating coil of the switch LS.

When the line-voltage relay 8 occupies its upper position, a circuit is established from the master controller contact-segment 123 through control finger 143, conductor 144, bridging contact member 127 of the relay 8, in its upper position, and conductor 145 to a junction-point 146, where the circuit divides, one branch including conductor 147, actuating coil "On," conductors 148 and 149, and contact segment 49 of the speed relay 7 to an intermediate control finger 50, and the other branch including conductor 150, bridging contact member 60b of the accelerating overload relay 11 in its lower position, conductor 151, actuating coil "Off," conductor 152 and contact segment 49 of the speed relay 7, whenever occupying its position $h$, to the intermediate control finger 50, whence a common circuit is completed through conductors 154 and 155 to the negative battery conductor 131.

Another circuit is completed, upon the energization of the line-voltage relay 8, from the positively-energized conductor 124 through conductor 156, bridging contact member 157 of the relay 8, in its upper position, conductor 158, bridging contact member 60a of the accelerating overload relay 11, in its lower position, conductor 159, contact segment 56 of the ampere-turn ratio-limiting relay 10, in its normal position $i$, conductor 160 and the actuating coil of the switch 28 to the negative conductor 131.

A further circuit is initially established from the master controller contact segment 123, through control finger 161, conductor 162, bridging contact member 163 of the over-voltage relay 9, in its lower position, conductor 164, bridging contact member 43 of the regenerative overload relay 6, in its lower position, conductor 165, contact segment 55 of the ratio-limiting relay 10, in its normal position $i$, and conductor 165a to the actuating coil of the switch 23.

If the master controller MC is actuated to its second regenerative position $b'$, a control finger 166 engages the contact segment 123, whence circuit is continued through conductor 167 and the actuating coil of the switch J to conductor 131.

In position $c'$, control finger 168 also engages the contact segment 123 to energize conductor 169 and the actuating coil of the switch J1. The control finger 132, which governs the parallel-connecting switches M and G, breaks contact with the segment 123 just prior to the energization of the switch J1, whereby the familiar parallel-series transition of the main armatures is effected in accordance with the main circuits previously traced.

Whenever the relay device 6 is raised to its circuit-opening position, upon the occurrence of a predetermined overload current under regenerative conditions, the switch 23 is quickly opened to insert the entire resistor 4 in circuit with both the main armature and the main field windings, whereby current conditions are rapidly restored to a normal value. Such circuit modification changes the operating characteristics of the main machines in such manner that a relatively "steep" speed-current characteristic curve obtains, that is, a material change of machine speed has little effect upon the regenerated current, which is thus prevented from attaining excessive values, irrespective of the concurrent location of the main control drum 15.

If desired, the resistor 4 may be associated with the control drum 15 to be varied in accordance with the parallel or series connection of the main armatures, for example, although, for the sake of simplicity and clearness, the switch 24 is illustrated as being adapted to short-circuit a portion of the resistor 4 whenever desired.

Furthermore, upon the opening movement of the switch 28, the actuating coils "On" and "Off" are concurrently deënergized by reason of the exclusion of the interlock 23—in from their energizing circuits. The main control drum 15 is thus moved backwardly to decrease the delivered voltage of the exciting armature 37 and also insert the accelerating resistors 12 and 13 in circuit with the respective main armatures to further reduce the overload current.

The line-voltage relay 8 serves several purposes. If the main-machine speed should be sufficiently high to permit satisfactory regenerative operation, but the main control drum 15 should happen to be in such position as to cause a relatively weak main-field excitation, a considerable time interval would elapse before the control drum could be moved to the proper position to effect regeneration. Consequently, if voltage conditions are such that the line-voltage relay 8 occupies its lower position, the energizing circuit of the actuating coil for the switch 28 is interrupted at the bridging contact member 157 to quickly strengthen the excitation of the exciting field winding 39 for the auxiliary generating armature 37 and thus effect a rapid building-up of the main-machine voltage at the beginning of an operating period.

Furthermore, the previously-traced energizing circuit for the actuating coils "On" and "Off" is interrupted at the bridging contact member 127 of the relay 8 in its lower position, whereby the main control drum 15 is moved in a backward direction, for a purpose about to be set forth. Thus, if the line-voltage relay 8 occupies its lower position and the switch 28 is open, it is undesirable to close the line switch LS until the main-control drum 15 has moved to its illustrated initial position. Such action is insured by the previously-traced energizing circuit for the actuating coil of the line switch LS through interlocks 28—out and 15—off and the bridging contact member 127 of the relay 8.

If desired, the occupation of its lower position by the relay 8 may also be utilized to complete a new circuit from the conductor 156 through bridging contact member 157 of the relay, interlocks 15—on and 28—out and an actuating coil marked "Air-brake" to the negative battery conductor 131. In this way, the vehicle airbrake, or any other auxiliary mechanical brake, may be rendered operative to decrease the vehicle speed until the initial or "off" position of the main control drum 15 is reached.

Whenever a relatively high voltage obtains across the main armatures by reason of a failure of supply-circuit voltage, for example, the over-voltage relay 9 is raised to open switches 23 and 25 and close switches 26 and 29, all of which will effect a reduction of the regenerated voltage until the relay device 9 again drops to its lower position. The opening of the switches 23 and 25 is accomplished by reason of the interruption of the previously-traced energizing circuits at the bridging contact members 163 and 140 of the over-voltage relay 9, while a new circuit is completed in the upper position of the relay from the contact segment 123 of the master controller through control finger 175 and conductor 176 to junction-point 177, where the circuit divides, one branch including conductor 178, bridging contact member 163 of the relay 9 and conductor 179 to the actuating coil of the switch 26, and the other branch including conductor 180, bridging contact member 140 of the relay 9, conductor 181, interlock 25—out and conductor 182 to the actuating coil of the switch 29.

Upon the occurrence of overload conditions during the accelerating period, the relay device 11 fulfils a similar function, in that the actuating coil of the switch 28 is deënergized by the interruption of its circuit between conductors 158 and 159 and, furthermore, the actuating coil "Off" is also deënergized. Such action will serve to reduce the overload conditions, although, if desired, the relay 11 may be utilized to deënergize the common energizing circuit for the actuating coils "On" and "Off" and thus produce a backward movement of the main control drum 15 under overload conditions.

The ampere-turn ratio-limiting device 10 is actuated to its position $j$ in opposition to the action of the spring 53a whenever an undesirably high ratio of main-armature ampere-turns to field-winding ampere-turns, which might cause "flash-over" conditions, occurs. At this time, the energizing circuit of the actuating coil for the switch 28 is interrupted at the contact segment 56 of the relay 10, and the circuit of the actuating coil for the switch 23 is interrupted at the similar contact segment 55. Thus, the auxiliary-circuit resistor 18 and the main-circuit resistor 4 are automatically rendered active to restore normal conditions.

Figures 4, 5:
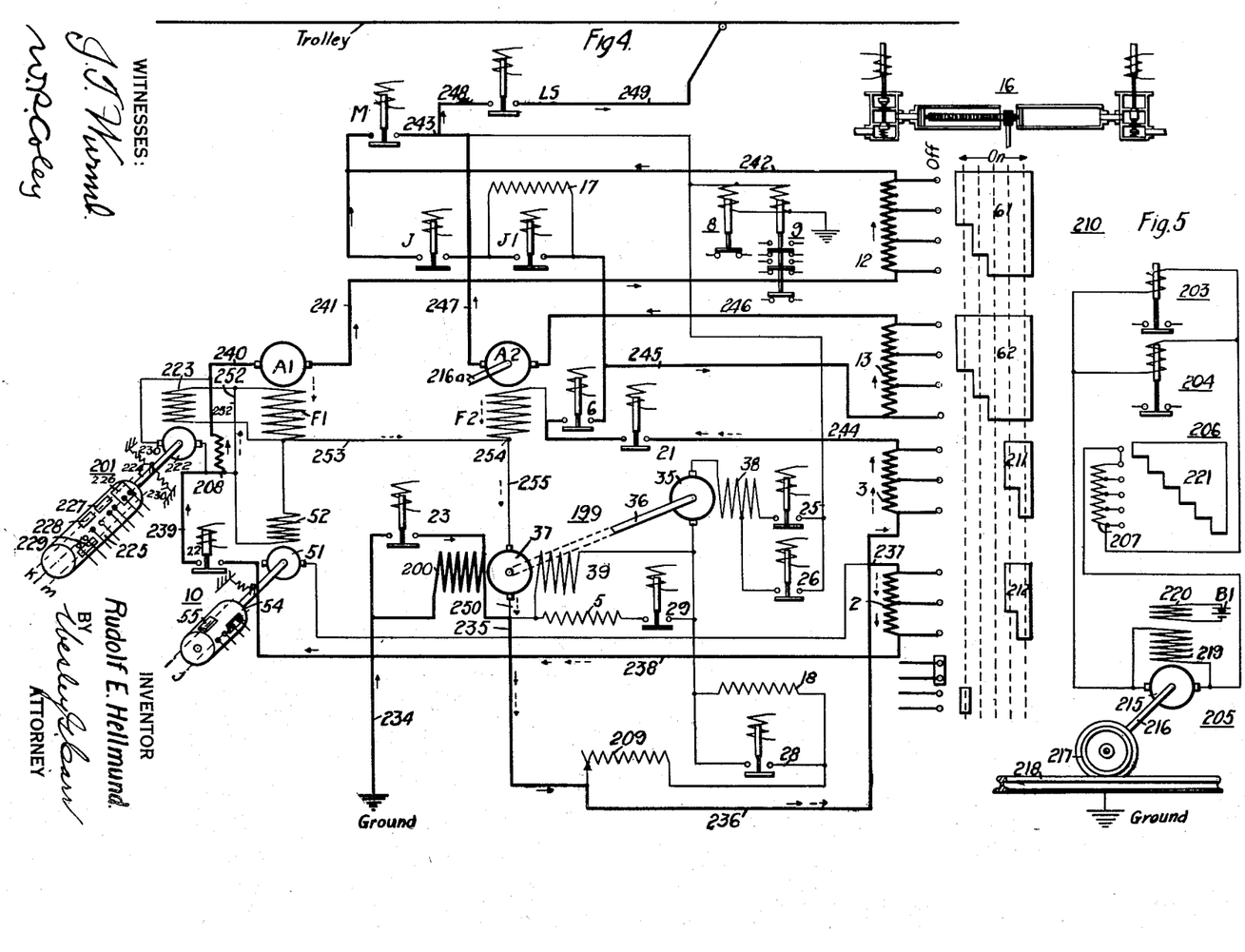
Fig. 4 and Fig. 6 are diagrammatic views corresponding, respectively, to Fig. 1 and Fig. 2, of a modification of my invention.
Fig. 5 is a diagrammatic view of an auxiliary system that is allied with the main system of Fig. 4 in a manner to be set forth.

Reference may now be had to Fig. 4 and Fig. 5 jointly, wherein the systems shown comprise the supply-circuit conductors, the main dynamo-electric machines, and certain resistors and switches, as shown in Fig. 1 and, in addition, a motor-generator set 199; an overload relay 201; a high-speed relay 203 and a low-speed relay 204, which are energized from an axle-driven exciter 205 in accordance with the position of a manual controller 206 that governs a regulating resistor 207; a main-circuit shunting resistor 208 for the overload relay 201, a variable resistor 209 which is associated with an exciting field winding for the motor-generator set 199; and a main drum controller 210 for varying the active circuit values of the resistors 12, 13, 3 and 2, in accordance with the movements of the actuating mechanism 16.

The axle-driven exciter 205 comprises a commutator-type armature 215 that is mounted upon a shaft 216, which may be either the shaft of the armature A2, as indicated by 216a, or may be a vehicle truck axle upon which is mounted a pair of wheels 217 that run upon the usual grounded track rails 218. The exciting armature 215 is provided with a self-excited shunt field winding 219 and a second field winding 220 which is energized from a small battery B1, for example, to insure the proper polarity of the axle-driven exciter at all times.

The actuating coils of the speed relays 203 and 204 are connected, through the variable resistor 207, across the axle-driven exciting armature 215. As indicated by the different numbers of turns in the speed relays, the settings thereof are different, the high-speed relay 203 normally occupying its lower or open-circuit position from which it is moved under relatively high-voltage conditions of the exciting armature 215, that is, upon a predetermined increase of vehicle speed, while the low-speed relay 204 normally occupies its upper or closed-circuit position and drops to its lower position only when the voltage of the axle-driven exciter decreases to a certain value. The manual controller 206 may be manipulated to effect the short-circuit of any desired section of the variable resistor 207 through a contact segment 221, whereby the average vehicle speed, as determined by the speed relays 203 and 204 may be manually adjusted.

In addition to the armatures and field windings that are illustrated in Fig. 1, the motor-generator set 199 is provided with a main-current excited field winding 200, which is adapted to be short-circuited by a switch 23, under predetermined conditions. The arrangement of parts is such that the two field windings 200 and 39 assist each other during regeneration, but counteract each other under accelerating conditions.

The overload relay 201 is of the torque-motor type, comprising a commutator-type armature 222, which is energized from the main-circuit resistor 208, and a field winding 223, which is connected across the main field winding F1. The relay shaft 224 carries a small drum or cylinder 225 upon which is mounted a plurality of contact segments 226, 227, 228 and 229 which engage pairs of auxiliary-circuit-control fingers in certain of the positions $k$, $l$ and $m$ of the relay, which is biased to the intermediate position $l$ by centering springs 230. When the torque of the relay device increases a certain amount during either acceleration or regeneration, the relay is actuated to its position $k$ or position $m$, respectively, to modify the governed auxiliary circuits, as described in connection with Fig. 6.

The control apparatus 210 includes contact segments 61 and 62 for gradually short-circuiting the accelerating resistors 12 and 13 in the early positions of the drum, and contact segments 211 and 212 for gradually short-circuiting the stabilizing resistors 3 and 2 in the later drum positions.

Assuming, by way of illustration, that regenerative operation has been inaugurated, in any suitable manner, the regenerative or main-armature circuit, indicated by solid arrows, may be traced as follows: from the supply conductor Ground through conductor 234, switch 23 or exciting field winding 200 for the auxiliary generating armature 37, conductors 235 and 236 to junction-point 237, where the circuit divides, one branch including stabilizing resistor 2 and conductor 238, switch 22, conductor 239, shunting resistor 208, conductor 240, main armature A1, conductor 241, accelerating resistor 12, conductor 242 and switch M to a second junction-point 243, and the other branch traversing stabilizing resistor 3, conductor 244, switches 21 and G, conductor 245, accelerating resistor 13, conductor 246, main armature A2 and conductor 247 to the junction-point 243, whence circuit is completed through conductor 248, switch LS and conductor 249 to the trolley.

The exciting or main-field-winding circuit is established from the positive terminal of the auxiliary generating armature 37 through conductors 250, 235 and 236 to the junction-point 237, where the circuit divides, one branch traversing stabilizing resistor 2, conductor 238, switch 22, conductors 239 and 252, main field winding F1 and conductor 253 to a junction-point 254, and the other branch including stabilizing resistor 3, conductor 244, switch 21 and main field winding F2 to the junction-point 254, whence a common circuit is completed through conductor 255 to the negative terminal of the auxiliary armature 37.

Figure 6:
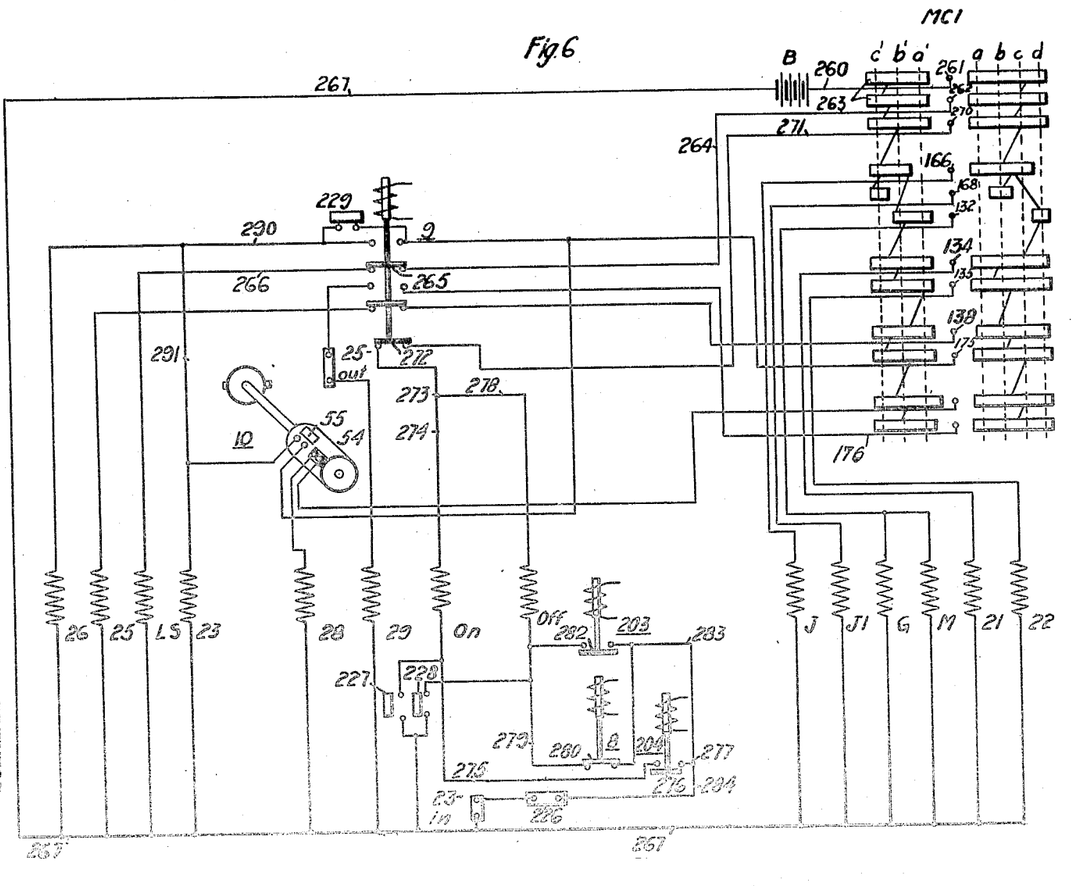

Referring now to Fig. 6, the system shown comprises various actuating coils and contact members of the switching apparatus that is employed in the system of Fig. 4 and, in addition, a master controller MC1 and a suitable source of energy, such as a battery B.

Assuming, by way of illustration, that the master controller MC1 is actuated to its initial regenerative position $a'$, one circuit is established from the positive terminal of the battery B through conductor 260, control fingers 261 and 262, which are bridged by contact segment 263, conductor 264, bridging contact member 265 of the over-voltage relay 9 in its lower position, conductor 266 and the actuating coil of the switch LS to the negative battery conductor 267.

A second circuit is simultaneously established from the contact segment 263, through control finger 270, conductor 271, bridging contact member 272 of the over-voltage relay 9, in its normal lower position, to a junction-point 273, where the circuit divides, one branch including conductor 274, actuating coil "On", conductor 275 and bridging contact member 276 of the low-speed relay 204, when occupying its temporary upper position, to a junction-point 277.

A second branch is completed from the junction-point 273 through conductor 278, the actuating coil "Off", conductor 279, bridging contact member 280 of the line-voltage relay 8, in its temporary lower position, or bridging contact member 282 of the high-speed relay 203, in its temporary upper position, and conductor 283 to the junction-point 277, whence a common circuit is completed through conductor 284, contact segment 226 of the overload relay 201 and interlock 23—in to the negative battery conductor.

The circuits of the remaining switches are closed in a manner identical with that set forth in connection with Fig. 2, and no further description of such operation is believed to be necessary.

The automatic operation of the various relay devices may be set forth as follows:— Whenever, (1) the low-speed relay 204 occupies its normal upper position, (2) the high-speed relay 203 occupies its normal lower position and (3) the line voltage relay 8 occupies its normal upper position, that is to say, under normal or average machine-speed conditions, the main control drum 210 remains in whatever position it happens to occupy, since the relays 8 and 203 merely interrupt the circuit of the "off" coil and thus do not effect any movement of the main control drum. However, if the vehicle speed increases to a predetermined degree, the correspondingly augmented voltage of the axle-driven exciter 205 will cause the high-speed relay 203 to lift and close the previously-traced circuit of the actuating coil "Off". Since both the actuating coils for the main control drum are thus concurrently energized, a forward movement of the drum is produced until the main-field-winding voltage has increased to cause the vehicle speed to decrease to the desired normal value.

On the other hand, if the vehicle speed decreases a certain amount, the correspondingly reduced voltage of the axle-driven exciter will allow both the high-speed relay 203 and the low-speed relay 204 to drop to their lower positions to open the circuit of the "off" coil and of the "on" coil, respectively, and thus effect backward movement of the main control drum 210, in accordance with the previously-explained principles, to decrease the main-field-winding voltage and correspondingly increase the machine speed to the desired value.

The operation of the over-voltage relay 9 and the ampere-turn ratio-limiting relay 10, in general, are similar to those previously set forth. However, it will be noted that in the present system, switch 23 short-circuits the main-current-excited field winding 200 for the auxiliary generating armature 37. In this way, by reason of the assisting action of the two field windings 200 and 39, under regenerative conditions, a rather "flat" speed-current characteristic curve for the main machines is obtained.

Whenever the switch 23 is closed, however, the balancing resistors 2 and 3 will provide a relatively "steep" characteristic curve, whereby excessive regenerating currents are prevented, in the manner previously explained.

In the system of Fig. 6, the switch 23 is closed under the same conditions under which switch 23 was opened in the system that is shown in Fig. 2. Thus, upon the movement of the over-voltage relay 9 to its upper position, a circuit is completed from master-controller control finger 175, through conductor 176, the bridging contact member 265 of the relay 9, conductors 290 and 291 to the actuating coil of the switch 23. Similarly, the movable contact segment 229 of the overload relay 201, in its outer position $k$, bridges conductors 176 and 290 to effect the closure of the switch 23.

Furthermore, upon the movement of the ratio-limiting relay 10 to its position $j$, the actuating coil of the switch 23, is energized, through the contact segment 55, which bridges conductors 176 and 291, to close the switch and short-circuit the field winding 200.

Under overload conditions during either acceleration or regeneration, the overload relay 201 temporarily assumes control of the actuating mechanism 16 for governing the main-circuit resistors 12, 13, 3 and 2, irrespective of the condition of the other governing relays. In the case of an accelerating overload, contact members 227 and 228 of the overload relay, in its position k, respectively connect conductors 275 and 279 to the negative battery conductor 267, whereby the "on" coil and the "off" coil are concurrently energized to effect a forward movement of the control drum 210 to strengthen the main-field-winding excitation, whereby the counter-electromotive force of the main armatures is correspondingly increased and the overload current immediately subsides to a normal value.

On the other hand, in the event of a regenerative overload current, the relay 201 moves to its position m to interrupt the common energizing circuit for the "on" coil and the "off" coil at the contact segment 226, whereby the control drum moves backwardly to decrease the main-field-winding excitation and cause a corresponding reduction of the regenerated current.

Upon the resumption of average conditions, the overload relay returns to its intermediate position from either of the outer positions, and the system is again automatically governed by other relays in the previously described manner.

Figure 7:
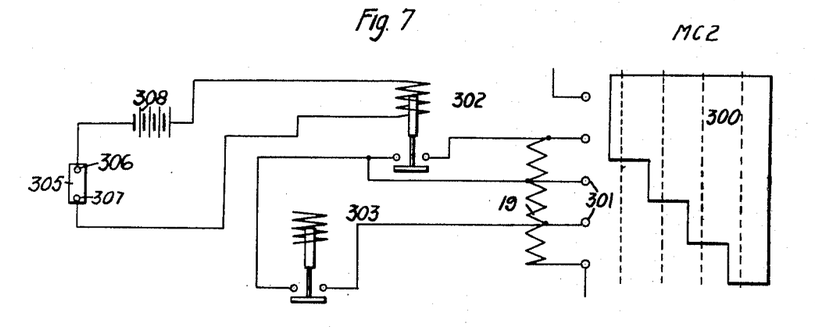
Fig. 7 is a diagrammatic view of another modification of a portion of the auxiliary systems that are shown in Fig. 2 and in Fig. 5.
Figure 8:
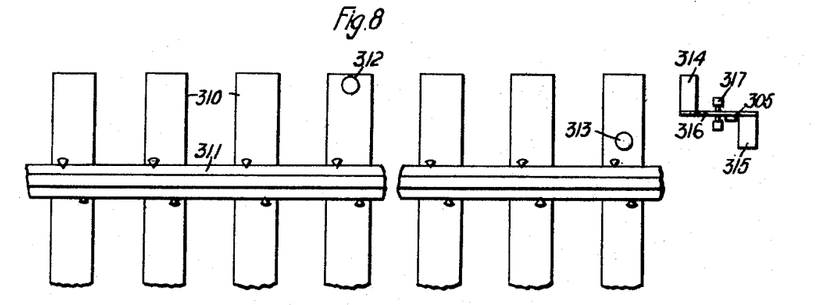
Fig. 8 and Fig. 9 are semi-diagrammatic views, in plan and in side elevation, respectively, of an automatic track switch that may be employed in connection with the automatic control of the illustrated systems.
Figure 9:
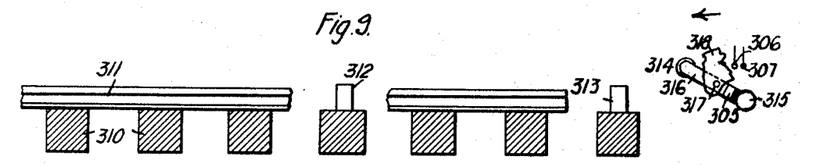

Referring to Figs. 7, 8 and 9, in certain cases it may be desirable to automatically take the speed control out of the hands of the train operator when the vehicle is passing certain stretches of track upon which relatively high speeds are dangerous or undesirable. Such automatic operation may readily be effected by suitable track-controlled switches which will limit the maximum amount of regulating resistor 19 in the system of Fig. 1 and resistor 207 in the system of Fig. 5, irrespective of the position of the corresponding manual controllers. In other words, while the average vehicle speed may normally be adjusted in the previously-described manner by the train operator, such speed will be automatically reduced to the maximum safe value for a given piece of track, irrespective of the manipulation of the manual controller.

Such a system is partially illustrated in Fig. 7, wherein the resistor 19, for example, is adapted to be manually governed by a master controller MC2 having a contact segment 300 of suitable configuration for engaging a plurality of control fingers 301 that are connected to various points of the resistor 19. A plurality of switches 302 and 303 for short-circuiting certain sections of the resistor 19 are provided, and the switch 302 is shown as having its actuating coil energized through a contact segment 305 and stationary control fingers 306 and 307 from a suitable source of energy, such as a battery 308. In this way, a certain section of the resistor 19 is short-circuited to limit the maximum vehicle speed, as previously described.

The switching mechanism for accomplishing the desired result is illustrated in Fig. 8 and Fig. 9, wherein is shown a plurality of the customary track ties 310 upon which rails 311 are laid, the ties 310 being provided at predetermined intervals corresponding to the stretch of track upon which it is desired not to exceed a certain vehicle speed, with posts or stops 312 and 313.

A pivotally mounted switching member is provided upon the traveling vehicle for the purpose of engaging stops 312 and 313 and thus regulating the action of the switches 302, etc. that are shown in Fig. 7. Such a switch may comprise roller members 314 and 315 for engaging the respective track posts 312 and 313, under predetermined conditions, the rollers being mounted upon a suitable arm 316 which is pivoted at 317 upon a convenient stationary portion or projection 318 of the vehicle frame. The contact segment 305 is mounted upon the oscillatable arm 316 for the purpose of bridging the control fingers 306 and 307, in a certain position of the switching device.

Assuming that the vehicle approaches the track post 313 from the right, as indicated by the arrow, as soon as the roller 315 strikes the post, the switching member is thrown to its upper position of engagement between the stationary and movable contact members to close one or more of the switch circuits that are illustrated in Fig. 7. When the track post 312 is reached, the other roller 314 strikes the post in such manner that the switch is again opened to the illustrated position, and the speed control of the vehicle is again entirely in the operator's hands.

I have thus provided a relatively simple control system embodying relatively slow-acting means, in the form of a main-field-excitation-varying controller that is governed by one or more "speed relays", for automatically maintaining a substantially constant machine speed, and relatively quick-acting means, in the form of the switch 23, for directly modifying certain portions of the machine circuits to prevent predetermined abnormal machine conditions.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine having an armature and a field winding, of means for varying the field-winding excitation to automatically maintain a substantially constant machine speed, means for manually determining said constant speed, and means for directly modifying certain portions of the machine circuits to prevent predetermined abnormal electrical conditions of the machine.

2. In a system of control, the combination with a dynamo-electric machine having an armature and a field winding, of an impedance device connected in circuit with said machine, a switch for normally excluding said device from circuit, means for varying the field-winding excitation to automatically maintain a substantially constant machine speed, means for manually effecting a selection of said constant speed, and means for opening said switch to insert said impedance device in circuit to prevent certain abnormal electrical conditions of the machine.

3. In a system of control, the combination with a dynamo-electric machine having an armature and a field winding, of a resistor connected in series relation with both said armature and said field winding, a switch for normally short-circuiting said resistor, means for varying the field-winding excitation to automatically maintain a substantially constant machine speed, means for opening said switch to render said resistor active under predetermined abnormal electrical conditions of the machine, and means, dependent upon the opening of said switch, for actuating said field-excitation-varying means.

4. In a system of control, the combination with a dynamo-electric machine having an armature and a field winding, of an exciting armature for said field winding, means for automatically varying the field-winding excitation to maintain a substantially constant machine speed, and means, dependent upon predetermined voltage conditions, for directly and independently varying such excitation at the beginning of a machine-operating period.

5. In a system of control, the combination with a supply circuit and a dynamo-electric machine having an armature and a field winding, of an exciting armature for said field winding, a multi-position controller for automatically varying the main-field-winding excitation to maintain a substantially constant machine speed, means, dependent upon relatively low machine-voltage conditions, for independently varying such excitation at the beginning of a machine-operating period, and means for preventing the connection of the machine to the supply circuit at such periods unless said controller occupies a predetermined position.

6. In a system of control, the combination with a dynamo-electric machine having an armature and a field winding, of a resistor connected in series relation with both said armature and said field winding, a switch for normally short-circuiting said resistor, means for automatically varying the field-winding-excitation to maintain a substantially constant machine speed, and a relay device, dependent upon the occurrence of a predetermined ratio of armature ampere-turns to field-winding ampere-turns, for opening said switch to render said resistor active.

7. In a system of control, the combination with a supply circuit and a dynamo-electric machine having an armature and a field winding, of a resistor connected in series relation with both said armature and said field winding, a switch for normally short-circuiting said resistor, a controller for varying the field-winding excitation, a relay device, dependent upon a balancing of supply-circuit voltage and of field-winding voltage, for automatically actuating said controller, and other relay devices, dependent upon predetermined abnormal conditions, for automatically opening said switch to protect the machine.

8. In a system of vehicle control, the combination with a dynamo-electric machine having an armature and a field winding, of means for varying the field-winding excitation, and an axle-driven armature for automatically governing said varying means to maintain a substantially constant machine speed.

9. In a system of vehicle control, the combination with a dynamo-electric machine having an armature and a field winding, of a controller for varying the field-winding excitation, an axle-driven generator, and a plurality of dissimilar relay devices energized from said generator to govern the operation of said controller in the one or the other direction.

10. In a system of vehicle control, the combination with a main dynamo-electric machine having an armature and a field winding, of an exciting armature for said field winding, an auxiliary field winding for said exciting armature, a switch for directly and materially modifying the effect of said auxiliary field winding, means for varying the main-field-winding excitation to maintain a substantially constant machine speed, and means, dependent upon predetermined abnormal conditions, for actuating said switch.

11. In a system of vehicle control, the combination with a main dynamo-electric machine having an armature and a field winding, of an exciting armature for said field winding, an auxiliary field winding for said exciting armature, a normally open switch connected across said auxiliary field winding, means for varying the main-field-winding excitation, an axle-driven armature for automatically governing said varying means to maintain a substantially constant machine speed, and means for closing said switch to prevent certain abnormal electrical conditions of the machine.

12. In a system of vehicle control, the combination with a main dynamo-electric machine having an armature and a field winding, of an exciting armature for said field winding, an auxiliary field winding for said exciting armature, a normally open switch connected across said auxiliary field winding, a controller for varying the main-field-winding excitation, an axle-driven generator, a plurality of dissimilar relay devices energized from said generator to govern the operation of said controller in the one or the other direction, and other relay means, dependent upon various abnormal electrical conditions of the machine, for closing said switch to restore normal operation.

13. In a system of vehicle control, the combination with a main dynamo-electric machine having an armature and a field winding, of an exciting armature for said field winding, an auxiliary field winding for said exciting armature, a normally open switch connected across said auxiliary field winding, a controller for varying the main-field-winding excitation, an axle-driven generator, a plurality of dissimilar relay devices energized from said generator to normally govern the operation of said controller in the one or the other direction, a relay device for assuming the control of said controller under predetermined abnormal electrical conditions of the machine, and other relay devices for closing said switch to restore normal operation.

14. In a system of railway vehicle control, the combination with a dynamo-electric machine, of means located upon the vehicle for normally varying the machine speed automatically, means for manually adjusting the average speed value, and means, located along the railway track, for automatically adjusting the machine speed.

15. In a system of railway vehicle control, the combination with a dynamo-electric machine having an armature and a field winding, of means located upon the vehicle for automatically varying said field-winding excitation to maintain a substantially constant machine speed, means for manually adjusting the average speed value, and stationary extraneous means for automatically adjusting the machine speed over certain stretches of the railway track.

16. In a system of railway vehicle control, the combination with a dynamo-electric machine having an armature and a field winding, of means, located upon the vehicle, for automatically varying said field-winding excitation to maintain a substantially constant machine speed, means for manually adjusting the average speed value, normally inoperative switching means for further adjusting the machine speed, and means, located along the railway track, for automatically rendering said switching means operative.

17. In a system of railway vehicle control, the combination with a dynamo-electric machine having an armature and a field winding, of means, located upon the vehicle, for automatically varying said field-winding excitation to maintain a substantially constant machine speed, means for manually adjusting the average speed value, a normally inoperative switching member, located upon the vehicle, for further adjusting the machine speed, and a plurality of members, spaced along the railway track, for respectively rendering said switching member operative and restoring it to the normal inoperative condition.

18. In a system of control, the combination with a dynamo-electric machine having an armature and a field winding, of means for affecting the "steepness" of the speed-current characteristic curve of said machine, means for automatically varying the field-winding excitation to maintain a substantially constant machine speed, and a relay device, dependent upon the occurrence of a predetermined ratio of armature ampere-turns to field-winding ampere-turns, for rendering the first-named means active.

19. In a system of control, the combination with a dynamo-electric machine having an armature and a field winding, of means for affecting the "steepness" of the speed-current characteristic curve of said machine, a controller for varying the field-winding excitation, a relay device, dependent upon a balancing of supply-circuit voltage and of field-winding voltage, for automatically actuating said controller, and other relay devices, dependent upon predetermined abnormal conditions, for automatically rendering said means active to protect the machine.

In testimony whereof, I have hereunto subscribed my name this 30th day of July, 1917.

RUDOLF E. HELLMUND.